(12) United States Patent
Kobayashi

(10) Patent No.: US 8,102,739 B2
(45) Date of Patent: Jan. 24, 2012

(54) OPTICAL DISK PLAYBACK APPARATUS AND OPTICAL DISK RECORDING/PLAYBACK APPARATUS

(75) Inventor: Nobuyoshi Kobayashi, Kanagawa (JP)

(73) Assignee: Sony Corporation, Tokyo (JP)

( * ) Notice: Subject to any disclaimer, the term of this patent is extended or adjusted under 35 U.S.C. 154(b) by 193 days.

(21) Appl. No.: 12/654,855

(22) Filed: Jan. 6, 2010

(65) Prior Publication Data

US 2010/0208560 A1 Aug. 19, 2010

(30) Foreign Application Priority Data

Feb. 17, 2009 (JP) ................................. 2009-034042

(51) Int. Cl.
*G11B 7/00* (2006.01)
(52) U.S. Cl. ............... 369/47.25; 369/47.35; 369/44.29; 369/44.35; 369/44.36
(58) Field of Classification Search ................ 369/47.25, 369/44.29, 47.35, 44.35, 44.36
See application file for complete search history.

(56) References Cited

U.S. PATENT DOCUMENTS 7,652,962 B2 * 1/2010 Zhou et al. .................... 369/53.1
2004/0095859 A1 * 5/2004 Kobayashi et al. ........ 369/44.29

FOREIGN PATENT DOCUMENTS

| JP | 08-111030 | 4/1996 |
|---|---|---|
| JP | 2001-351249 | 12/2001 |
| JP | 2004-253016 | 9/2004 |

* cited by examiner

*Primary Examiner* — Latanya Bibbins
(74) *Attorney, Agent, or Firm* — Rader, Fishman & Grauer PLLC

(57) ABSTRACT

Disclosed herein is an optical disk playback apparatus including: a signal playback device configured to read and decode information recorded to an optical disk through an optical pickup unit in order to reproduce the information; the signal playback device including a signal generation circuit, a first signal processing device, a second signal processing device, a modulator, a switch, an analog to digital converter, and a third signal processing device.

20 Claims, 7 Drawing Sheets

RF_sum

RFAC

RFDC_sum

DSB SIGNAL

Demod_out:RFDC_demod

OPTICAL DISK PLAYBACK APPARATUS AND OPTICAL DISK RECORDING/PLAYBACK APPARATUS

BACKGROUND OF THE INVENTION

1. Field of the Invention

The present invention relates to an optical disk playback apparatus and an optical disk recording/playback apparatus whereby a unipolar RFDC signal is balanced-modulated and fed to a data-reproducing RFAC section for demodulation in order to acquire an off-track signal or a modulation factor.

More particularly, the invention relates to an optical disk playback apparatus and an optical disk recording/playback apparatus for causing an RFAC-based AGC (Automatic Gain Control) to demodulate the balanced-modulated RFDC signal into a demodulated RFDC signal before normalizing the demodulated signal by reflectance in order to suppress those variations in modulation factor measurements which are caused by the variations in reflectance.

2. Description of the Related Art

In general, the optical disk playback apparatus and optical disk recording/playback apparatus use an OFTRK (off-track) signal in order to apply pulling brakes at seek time. The OFTRK signal is a signal that binarizes the bottom level, which shows an opposite change to an absolute value of the off-track amount, in reflectance of the mark strings recorded on the optical disk. As such, the OFTRK signal has a phase difference of 90 degrees relative to tracking errors. The OFTRK signal and a TEZC signal (tracking error binarizing signal) are AND'ed to generate a brake signal. A servo controller uses this brake signal as a gate signal by which to let a brake current flow through the tracking coil.

Generally, the optical disk recording/playback apparatus uses the modulation factor of the mark strings recorded on the optical disk as a control index for OPC (optimum power control). Parenthetically, there are two types of optical disks: those on which the reflectance of recorded marks drops, and those on which the reflectance rises. The present invention applies to both types of disks. Thus it is assumed for the ensuing description that the reflectance of the marks on the disk drops.

The modulation factor of the mark strings is calculated using the following formula: [(space reflectance−mark reflectance)/space reflectance]. Space reflectance is equal to the reflectance of unrecorded disks.

The OFTRK (off-track) signal and modulation factor need to be acquired from the RFDC signal in which space reflectance and mark reflectance are preserved. Usually, one of the following two methods has been adopted to obtain the OFTRK signal and modulation factor from the RFDC signal:

(1) As shown in FIG. 6, an ordinary optical disk recording/playback apparatus 300 inputs the RFDC signal to high-speed wideband HP (peak hold)/BH (bottom hold) circuits whose outputs are subjected to calculations for obtaining the OFTRK signal and the modulation factor. The PH value stands for space reflectance and the BH value for mark reflectance. More specifically, the OFTRK signal is acquired by binary slicing the output signal of the BH circuit, and the modulation factor is obtained by performing the calculations of [(PH output signal−BH output signal)/PH output signal].

(2) As shown in FIG. 7, an ordinary optical disk recording/playback apparatus 400 digitizes the RFDC signal through an RFAC-based analog/digital converter (ADC) before inputting the resulting digital signal to PH and BH circuits. The process outlined in the preceding paragraph (1) is then digitally carried out to acquire the OFTRK signal and modulation factor.

In connection with the related art, the reader is requested to refer to Japanese Patent Laid-open Nos. Hei 8-111030, 2001-351249, and 2004-253016.

SUMMARY OF THE INVENTION

One problem with the ordinary optical disk recording/playback apparatus is as follows: the signal processing method (1) above for obtaining the OFTRK signal and modulation factor requires the use of a wideband wide dynamic range RFDC section and hold capacitors in the PH/BH circuits. The method (1) further requires driving the hold capacitors at high speed. These requirements lead to increases in both the scope of circuitry and the amount of power consumption.

The signal processing method (2) above avoids increasing the scope of circuitry or raising the amount of power consumption by use of digitized PH/BH circuits. Since an AC connection (indicated by reference numeral 118 in FIG. 6) needs to be removed, offset control becomes necessary. However, the nature of the RFDC signal prohibits utilizing a feedback-based offset control scheme. This requires implementing a circuit design by which the absolute value of offset is lowered through appropriately sized transistors. Furthermore, because the unipolar signal is input, a dynamic range at least twice as wide as that of the RFAC signal is required.

If the method (2) above is adopted, then it becomes necessary to provide the upstream RFAC section with a wideband wide dynamic range commensurate to the RFDC section. It follows that both the scope of circuitry and the amount of power consumption again need to be increased.

In order to avoid enlarging the circuitry of the RFAC section as a side effect of the method (2) above, a third method (3) may be conceived whereby a dedicated section for the RFDC signal and a dedicated ADC in connection therewith are provided. However, these added elements require putting new circuits in place which consume more power. Such measures run counter to the initial objective of reducing the scope of RFDC circuitry and lowering the amount of power consumption.

Another problem with the ordinary optical disk recording/playback apparatus is as follows: OPC (optimum power control) is implemented with modulation factor taken as control index as described above, and the modulation factor is calculated by an MPU (micro processing unit) or servo DSP (digital signal processor). To calculate the modulation factor requires the MPU or servo DSP to obtain a PH (peak hold) value and a BH (bottom hold) value of the RFDC signal before carrying out the calculation of [(PH−BH)/PH]. The PH value represents space reflectance and the BH value denotes mark reflectance. However, the actual optical disk is subject to in-plane reflectance variations translating into revolving variations in the PH and BH values. And because the PH value and the BH value are acquired at different timings, an error occurs during the normalizing calculations (*1/PH) based on space reflectance. Thus it has been difficult completely to suppress the variations in a converged OPC value which are caused by the in-plane variations in reflectance.

The present invention has been made in view of the above circumstances and provides an optical disk playback apparatus and an optical disk recording/playback apparatus capable of reducing the scale of circuitry and the amount of power consumption, both being liable to increase because the RFDC signal requires a wideband commensurate that of the RFAC signal and a dynamic range at least twice as wide as that of the RFAC signal.

The present invention further provides an optical disk playback apparatus and an optical disk recording/playback apparatus capable of raising the accuracy of OPC with a minimum of modulation factor variations attributable to reflectance variations by normalizing the acquired RFDC signal with reflectance, because the variations in modulation factor measurements tend to be pronounced due to the in-plane variations in reflectance.

In carrying out the present invention and according to one embodiment thereof, there is provided an optical disk playback apparatus having a signal playback device configured to read and decode information recorded to an optical disk through an optical pickup unit in order to reproduce the information. The signal playback device includes: a signal generation circuit configured to generate a carrier signal; a first signal processing device configured to sum up a plurality of signals output from a photodetector of the optical pickup unit in order to output a unipolar RFDC signal; a second signal processing device configured to sum up the plurality of signals output from the photodetector of the optical pickup unit and then remove a DC component from the summed-up signal in order to output a bipolar RFAC signal; a modulator configured to be fed with the unipolar RFDC signal and the carrier signal so as to modulate the carrier signal with the RFDC signal to output a modulated signal; a switch configured to be fed with either the bipolar RFAC signal or the modulated signal coming from the modulator, the switch being further configured to output either the bipolar RFAC signal if the bipolar RFAC signal is input or the modulated signal coming from the modulator following a switchover of signal paths if the RFDC signal is input; an A/D converter configured to digitize either the modulated signal or the RFAC signal output from the switch; and a third signal processing device configured to demodulate the modulated signal digitized by the A/D converter in order to derive at least either a modulation factor or an off-tracking signal from the demodulated signal.

Preferably, the optical disk playback apparatus of the embodiment may further include: a VCA (Voltage Controlled Amplifier) circuit located upstream of the A/D converter and configured to control the input amplitude of the A/D converter; an AGC control circuit located downstream of the A/D converter and configured to control the output amplitude of the A/D converter to a predetermined value; and a D/A conversion circuit configured to convert a control signal of the AGC control circuit into analog form to control the gain of the VCA circuit.

According to another embodiment of the present invention, there is provided an optical disk recording/playback apparatus having a signal recording device configured to write coded information to an optical disk through an optical pickup unit, and a signal playback device configured to read and decode the information recorded to the optical disk in order to reproduce the information. The signal playback device includes: a signal generation circuit configured to generate a carrier signal; a first signal processing device configured to sum up a plurality of signals output from a photodetector of the optical pickup unit in order to output a unipolar RFDC signal; a second signal processing device configured to sum up the plurality of signals output from the photodetector of the optical pickup unit and then remove a DC component from the summed-up signal in order to output a bipolar RFAC signal; a modulator configured to be fed with the unipolar RFDC signal and the carrier signal so as to modulate the carrier signal with the RFDC signal to output a modulated signal; a switch configured to be fed with either the bipolar RFAC signal or the modulated signal coming from the modulator, the switch being further configured to output either the bipolar RFAC signal if the bipolar RFAC signal is input or the modulated signal coming from the modulator following a switchover of signal paths if the RFDC signal is input; an A/D converter configured to digitize either the modulated signal or the RFAC signal output from the switch; and a third signal processing device configured to demodulate the modulated signal digitized by the A/D converter in order to derive at least either a modulation factor or an off-tracking signal from the demodulated signal.

Preferably, the optical disk recording/playback apparatus of the embodiment may further include: a VCA circuit located upstream of the A/D converter and configured to control the input amplitude of the A/D converter; an AGC control circuit located downstream of the A/D converter and configured to control the output amplitude of the A/D converter to a predetermined value; and a D/A conversion circuit known as DAC and configured to convert a control signal of the AGC control circuit into analog form to control the gain of the VCA circuit.

According to the present invention, the off-track signal is acquired as follows: a switch is activated in such a manner as to output either the RFAC signal at on-track time or the RFDC signal at off-track time following balanced modulation. The signal output from the switch is demodulated, and a bottom hold value of the demodulated signal is binarized to obtain the off-track signal.

Modulation factor is obtained according to the present invention as follows: the switch is activated in such a manner as to output either the RFAC signal at normal read time or the RFDC signal upon modulation factor acquisition. The signal output from the switch is then demodulated, and peak hold value and a bottom hold value of the demodulated signal are used to obtain the modulation factor. Upon modulation factor acquisition, the RFAGC can be operated in the same manner as at normal read time.

According to the present invention, the RFDC signal is balanced-modulated before being fed to an RF signal playback section and demodulated following A/D conversion. The RFDC signal is arranged to be input through an RFAC section to acquire an off-track (OFTRK) signal or a modulation factor. The invention thus envisages reducing the scale of circuitry as well as the size of the RFDC section that consumes much power. Upon modulation factor acquisition, the RFAGC is arranged to act in the same manner as at normal read time. These arrangements normalize the RFDC signal following demodulation with reflectance, suppress modulation factor variations caused by in-plane variations in reflectance, and improve OPC accuracy.

BRIEF DESCRIPTION OF THE DRAWINGS

Further features and advantages of the present invention will become apparent upon a reading of the following description and appended drawings in which.

DETAILED DESCRIPTION OF THE PREFERRED EMBODIMENTS

Some preferred embodiments of the present invention will be described below under the following headings:

1. Description of the structure and operation of the optical disk recording/playback apparatus
2. Description of the block structure for RF signal processing and the workings of the blocks configured
3. Description of the overall operation of the RF signal processing circuit
4. Description of the structure and operation of the demodulator <1. Description of the Structure and Operation of the Optical Disk Recording/playback Apparatus>

Figure 6:
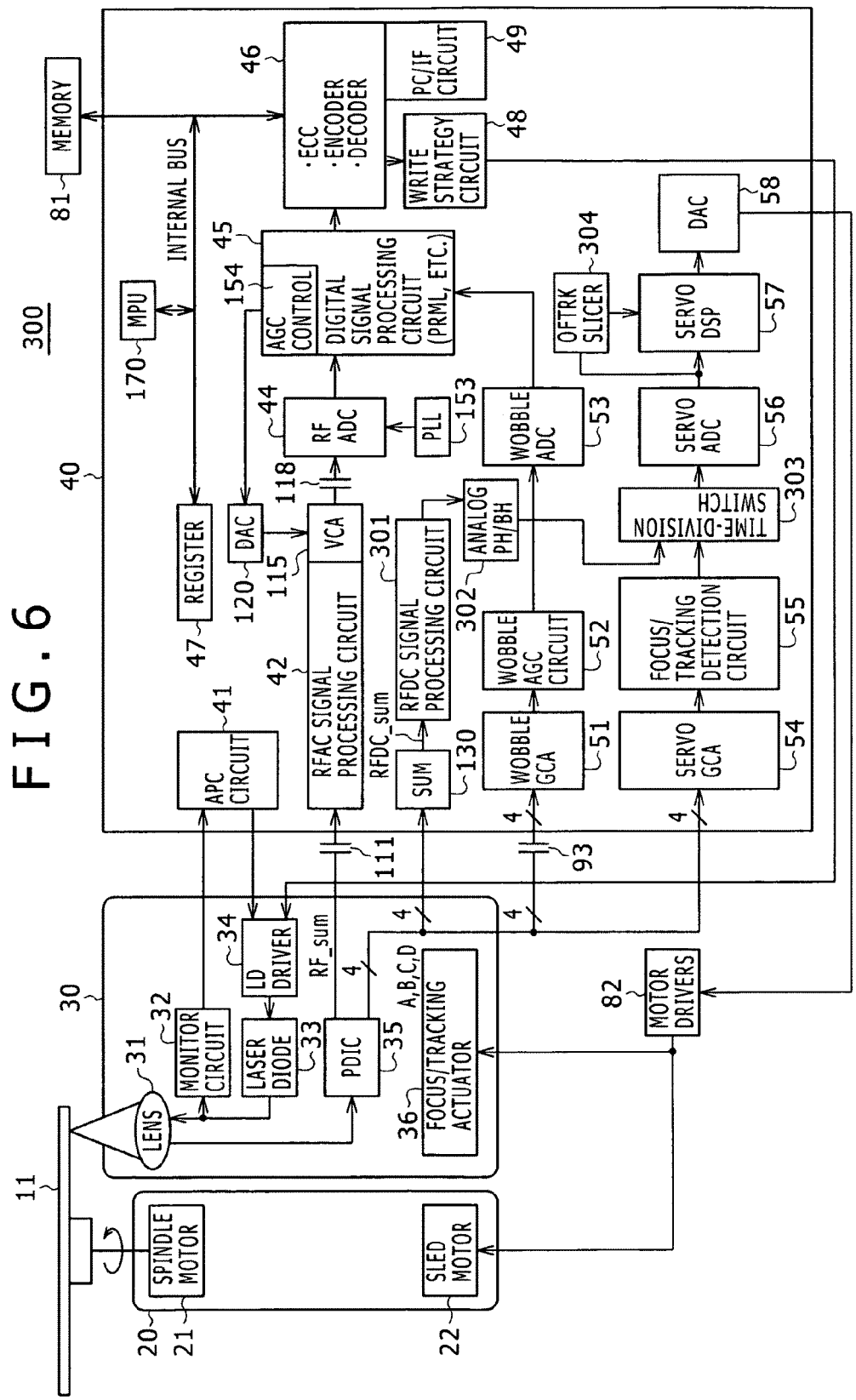
FIG. 6 is a block diagram of an optical disk recording/playback apparatus as a first ordinary example.
Figure 7:
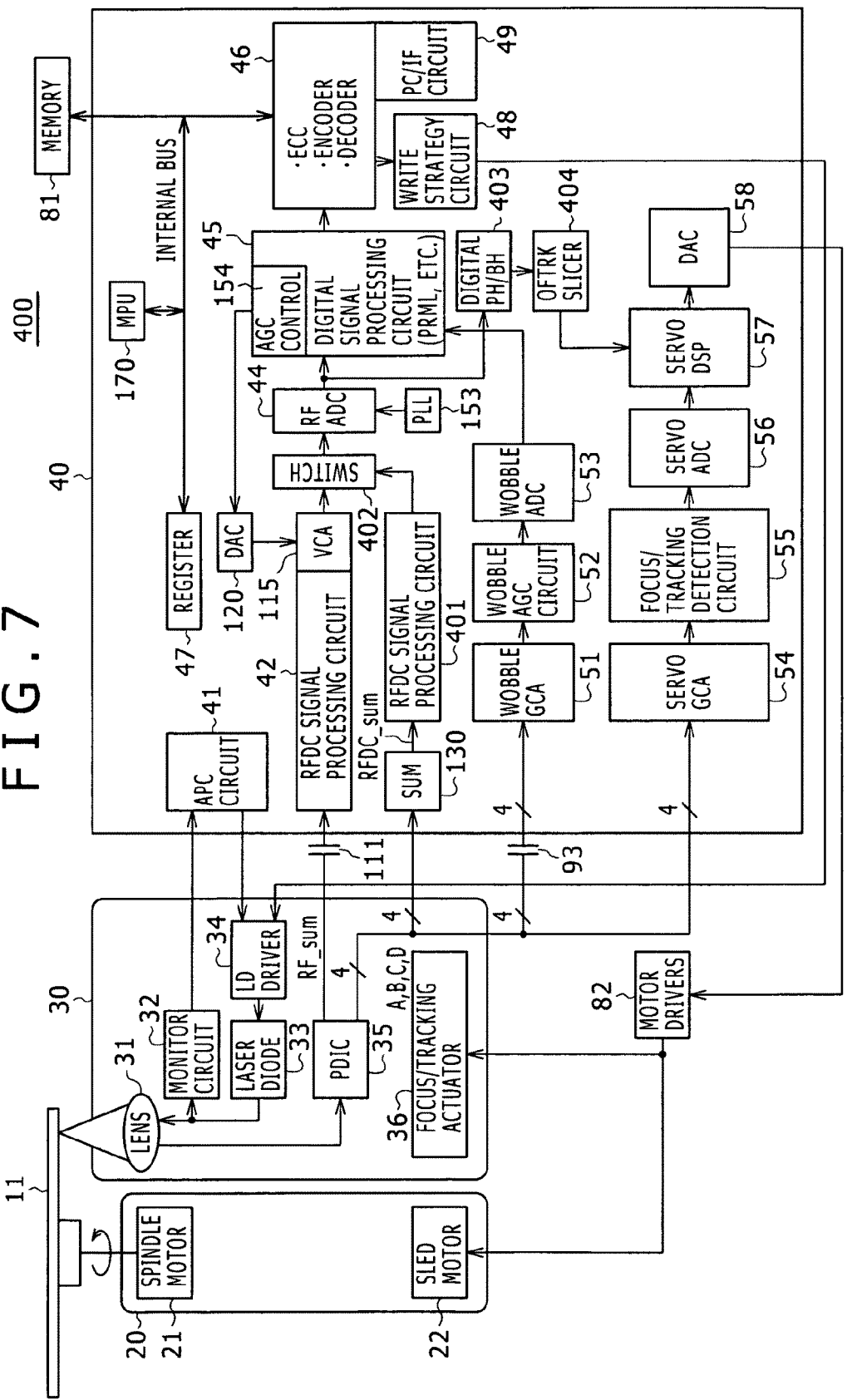
FIG. 7 is a block diagram of an optical disk recording/playback apparatus as a second ordinary example.

Although what follows is a description of an optical disk recording/playback apparatus embodying the present invention, the description also applies to an optical disk playback apparatus having solely a playback device. Throughout FIGS. 1, 6 and 7, like reference numerals denote like or corresponding circuit blocks.

Figure 1:
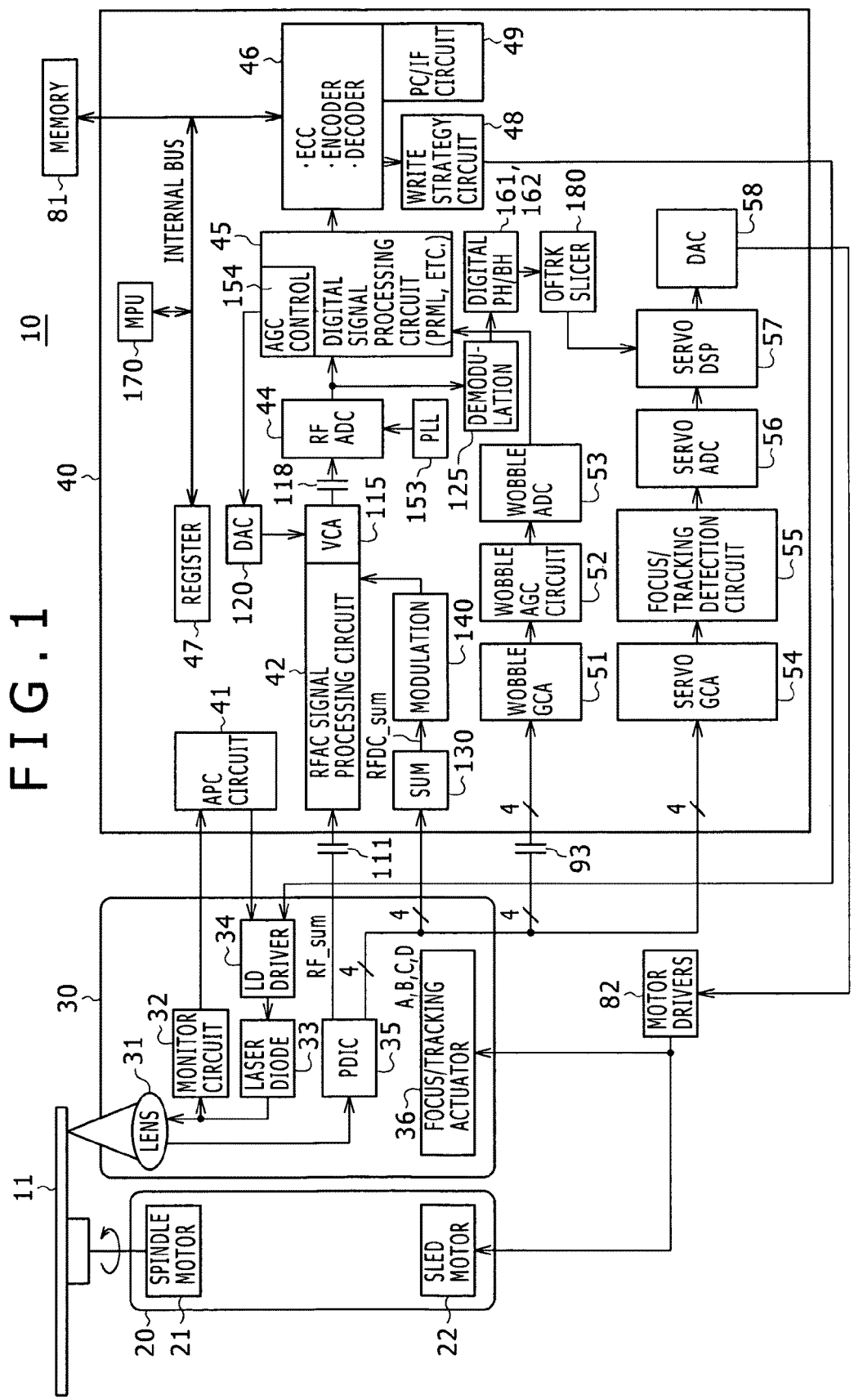
FIG. 1 is a block diagram of an optical disk recording/playback apparatus embodying the present invention.

FIG. 1 shows a block structure of an optical disk recording/playback apparatus 10. The optical disk recording/playback apparatus 10 is made up of a motor drive control device 20 for controlling the rotation of an optical disk 11, an optical pickup unit 30, a signal processing device 40, a memory 81, and motor drivers 82.

The motor drive control device 20 is constituted by a spindle motor 21 for controlling the rotation of the optical disk 11 and by a sled motor 22 for controlling the position of the optical pickup unit 30.

The optical pickup unit 30 is made up of a lens 31, a monitor circuit 32, a laser diode 33, a laser diode (LD) driver 34, a PDIC (photodetector IC) 35, and a focus/tracking actuator 36. The above-mentioned PDIC 35 is composed of a photodiode and an operational amplifier, not shown.

The output of the optical pickup unit 30 is connected to the input of the signal processing device 40 through a flexible cable or the like.

The PDIC 35 for acquiring electrical signals from reflected light coming from the optical disk 11 is illustratively constituted by a quadrant type photodiode that outputs four signals A, B, C and D. The PDIC 35 outputs a summed-up signal A+B+C+D as an RF signal (RF_sum).

The signal processing device 40 contains an analog and a digital signal processing section. The analog signal processing section is made up of an APC (automatic power control) circuit 41; an RFAC signal processing circuit 42 including a filter, an equalizer and a buffer; and an RFDC signal processing circuit composed of a sum circuit 130 and a balanced modulation device 140. The digital signal processing section is constituted by an RFADC 44, a digital signal processing circuit 45, an ECC (Error Correcting Code) encoder/decoder 46, a write strategy circuit 48, and a PC interface (IF) circuit 49.

The signal processing device 40 also includes a control section made up of a wobble GCA 51, a wobble AGC circuit 52, a wobble ADC 53, a servo GCA 54, a focus/tracking detection circuit 55, a servo ADC 56, a servo DSP 57, a DAC 58, a register file 47, and an MPU 170. The register file 47 is located on the bus of the MPU 170, and the servo DSP 57 is connected to that bus via a bridge circuit, not shown. The settings, status records, and various data of the blocks in the signal processing device 40 are written and read to and from suitable addresses in the register file 47 by way of a register access circuit, not shown.

The optical disk recording/playback apparatus 10 further includes a memory 81, motor drivers 82, and a computer (PC), not shown.

Grooves are formed on the optical disk 11 in wobbling fashion based on absolute time information. A wobble signal modulated by such information as addresses is recorded along the grooves, and the information thus recorded is read from the grooves. The optical disk 11 is rotated by the spindle motor 21 at constant linear velocity (CLV) or constant angular velocity (CAV) in synchronism with the wobble signal while being adjusted in terms of tracking and focusing.

The optical pickup unit 30 is positioned opposite the optical disk 11 so as to record or reproduce information to or from the disk 11. The optical pickup unit 30 contains the laser diode 33 and PDIC 35. At information recording time, the light output from the laser diode 33 is emitted to the optical disk 11 through the lens 31 to write information to the disk 11. At information playback time, the information recorded on the optical disk 11 is input to the PDIC 35 in the form of reflected light. In the PDIC 35, the quadrant type photodiode generates four signals A, B, C and D. The PDIC 35 outputs the four signals A, B, C and D as well as an RF signal obtained by summing up the four signals.

Decoding the RF signal (RF_sum) reproduces information such as video (picture) and audio signals. During playback, the signals A, B, C and D are used to generate control signals including the wobble signal, focus signal, and tracking signal. At information recording time, the signals A, B, C and D are also used to generate such signals as the wobble signal, focus signal and tracking signal.

The RF signal output from the PDIC 35 is fed to the RFAC signal processing circuit 42. The input RF signal is held constant in terms of signal level by an RF-AGC circuit, not shown. Thereafter, with its high frequency emphasized by the equalizer, the input signal is forwarded to the immediately downstream RFADC 44 whereby the analog RF signal is converted to a digital signal.

When the optical pickup unit 30 is controlled in tracking to stay in an on-track state typically at normal read time, the RFADC 44 converts the RFAC signal from analog to digital form. The resulting digital signal is output to the digital signal processing circuit 45.

Meanwhile, when the optical pickup unit 30 is not controlled in tracking illustratively at seek time or when the modulation factor of mark strings is measured typically at OPC execution time, the signals A, B, C and D output from the PDIC 35 are summed up, and the resulting RFDC signal is balanced-modulated. The modulated signal may be arranged through a switch to take the place of the above-mentioned RFAC signal before being fed to the RFADC 44 for A/D conversion. The resulting digital signal is output to the digital signal processing circuit 45.

The digital signal processing circuit 45 performs PRML (Partial Response Maximum Likelihood) processing, 1-7PP demodulation, 8-16 demodulation, and EFM (Eight to Fourteen Modulation) demodulation. The processed signal is then submitted to the ECC encoder/decoder 46 for error correction. The digital signal output from the RFADC 44 is subjected to arithmetic processing whereby the modulation factor and off-track (OFTRK) signal are acquired.

The digital data having undergone error correction by the ECC encoder/decoder 46 is sent to a host PC, not shown, through the PC interface circuit 49. The host PC performs decoding processes related to MPEG-2, AC-3, etc.

The signals A, B, C and D output from the PDIC 35 are each converted from analog to binary form. The resulting binary signals are logically operated on to generate sampling pulses for sample and hold (S/H) purposes. The sampling pulses are used to sample an original wobble signal generated based on the signals A, B, C and D. The original wobble signal is sampled and held at predetermined timings to generate an accurate wobble signal. The accurate wobble signal is then submitted to the wobble AGC circuit 52 typically for AGC processing. The gain-controlled wobble signal is converted by the wobble ADC 53 into a digital signal. The digital signal is then output to the digital signal processing circuit 45 for demodulation and decoding, before being decoded for address acquisition.

A servo signal generated based on the signals A, B, C and D output from the PDIC 35 is controlled in terms of output signal amplitude by the servo GCA 54. The focus/tracking detection circuit 55 detects the focus signal and tracking signal for controlling the optical pickup unit 30. The detected signals are output to the servo ADC 56 for conversion to digital signal. The digital signals are processed by the servo DSP 57 and converted to analog signals by the DAC 58 before being fed to the motor drivers 82. Control signals output from the motor drivers 82 are output to the focus/tracking actuator 36 and sled motor control circuit (indicated as the sled motor in FIG. 1) 22. The control signals are used to control the optical pickup unit 30, spindle motor, and sled motor for focus and tracking adjustment.

At write time, the audio signal and video signal are encoded by the host PC (not shown) into digital signals in the compression format such as AC-3 or MPEG-2. The digital signals are then packetized and encrypted before being fed to the PC interface circuit 49 as digital data. The digital data input through the PC interface circuit 49 is supplemented with ECC by the ECC encoder/decoder 46 and encoded in a predetermined physical format of the optical disk such as Blu-ray Disk (registered trademark), before being coded illustratively for 1-7PP modulation. The coded digital signal is modulated by the write strategy circuit 48 which effects modulation for the laser diode 33 and which provides write pre-compensation typically using a multi-pulse modulation system. The modulated signal is supplied to the laser diode 33 through the LD driver 34. A laser beam reflecting the on/off-state of the modulation pulses fed to the laser diode 33 is emitted to the optical disk 11 to write information thereto.

The monitor circuit 32 detects the reflected light coming from the optical disk 11, and outputs the value detected from the reflected light to the APC circuit 41. Based on the detected value received, the APC circuit 41 acquires a control signal that will set the write power of the laser diode 33 to a predetermined level and outputs the acquired control signal to the LD driver 34. As a result, the LD driver 34 controls the write strategy circuit 48 outputting modulating pulses in a manner optimizing the write power of the laser diode 33.

<2. Description of the Block Structure for RF Signal Processing and the Workings of the Blocks Configured>
[Block Structure for RF Signal Processing]

Described below is the block structure for RF signal processing as part of this preferred embodiment of the present invention.

Figure 2:
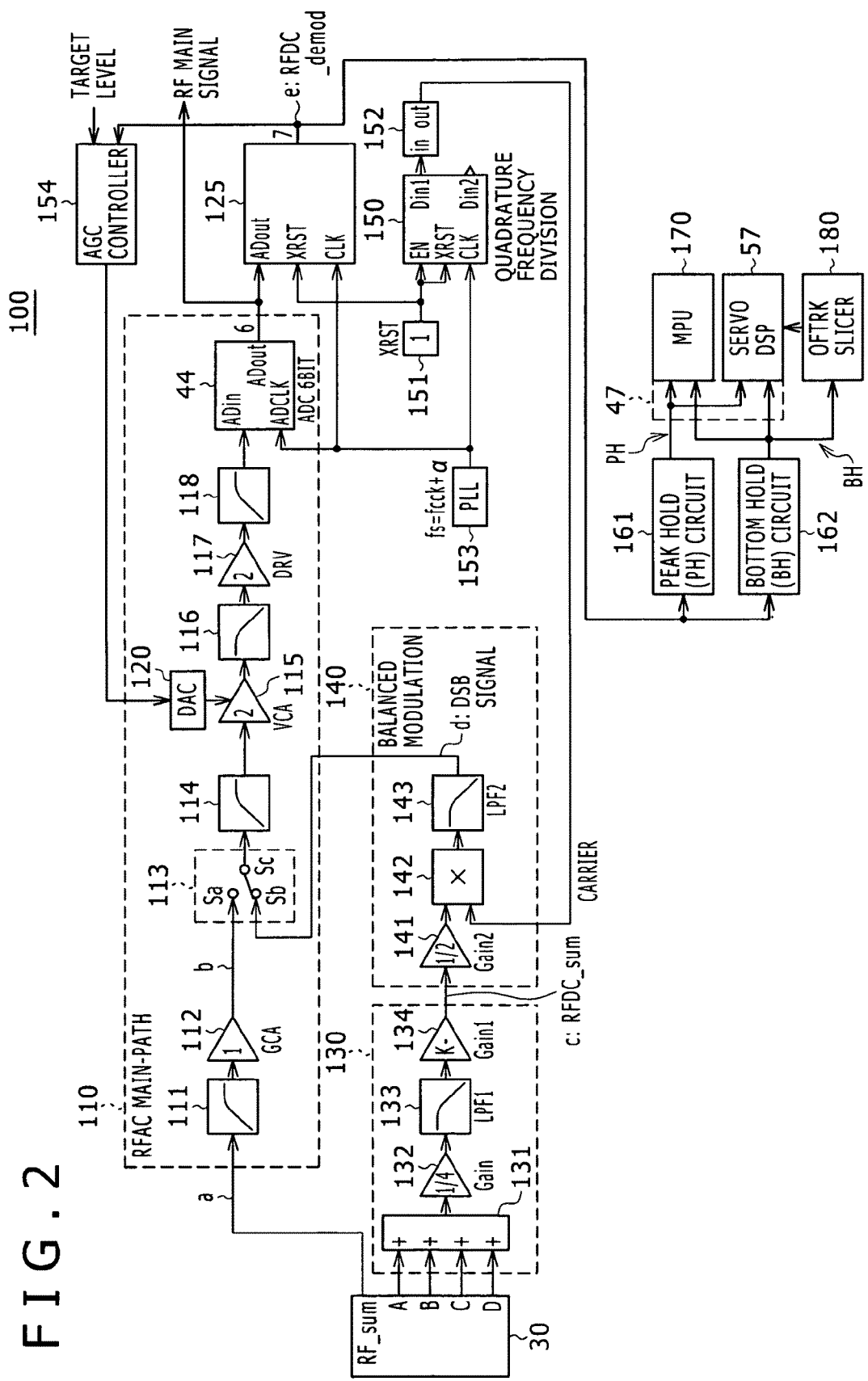
FIG. 2 is a block diagram of an RFAC signal processing circuit and an RFDC signal processing circuit.

FIG. 2 shows a typical structure of blocks for RF signal processing including a demodulator 125. The blocks for RF signal processing correspond to the RFAC signal processing circuit 42, RFADC 44, sum circuit 130, balanced modulation device 140, demodulator 125, VCA 115, and DAC 120 shown in FIG. 1.

As shown in FIG. 2, the RFAC signal processing circuit 42 is made up of a high-pass filter (HPF) 111, a gain-controlled amplifier (GCA) 112, a switch 113, another HPF 114, a voltage-controlled amplifier (VCA) 115, a low-pass filter (LPF) 116, a driver (DRV) 117, another HPF 118, and the RFADC 44.

The above-mentioned RFAC signal is obtained by summing up the quadrant outputs A, B, C and D from the PDIC 35 to form an RF_sum signal and by removing from the RF_sum signal the DC component illustratively through high-pass filtering (AC coupling) to obtain only the AC component (RF signal). As such, the RFAC signal is a bipolar (+/−) signal.

Described below is a typical structure of connections in the RFDC signal processing circuit composed of the RFAC signal processing circuit 110, sum circuit 130, and balanced modulation device 140.

[Structure of the RFAC Section]

The output terminal of the optical pickup unit 30 is connected to the input terminal of the HPF 111. The output terminal of the HPF 111 is connected to the input terminal of the GCA 112. The output terminal of the GCA 112 is connected to a first input terminal Sa of the switch 113.

The output terminal Sc of the switch 113 is connected to the input terminal of the HPF 114. The output terminal of the HPF 114 is connected to the input terminal of the VCA 115. The output terminal of the VCA 115 is connected to the input terminal of the LPF 116. The control terminal of the VCA 115 is connected to the output terminal of the DAC (digital/analog converter) 120.

The output terminal of the LPF 116 is connected to the input terminal of the driver (DRV) 117. The output terminal of the driver 117 is connected to the input terminal of the HPF 118. The output terminal of the HPF 118 is connected to the RFADC 44.

[Structure of the RFDC Section]

The output terminals of the photodiode in the optical pickup unit 30 are connected to the input terminals of an operational amplifier (OPAMP) 131 constituting part of the sum circuit 130. The output terminal through which to output the signal formed by summing up the signals A, B, C and D (RF signals) is connected to the input terminal of the immediately downstream amplifier 132.

The output terminal of the amplifier 132 is connected to the input terminal of an LPF1 (133). The output terminal of the LPF1 (133) is connected to the input terminal of an amplifier 134.

The sum circuit 130 contains the amplifier 132, LPF1 (133), and amplifier 134 and is installed as an inverting-summing integrator based on the OPAMP 131.

The output terminal of the amplifier 134 is connected to the input terminal of an amplifier 141 constituting part of the balanced modulation device 140. The output terminal of the amplifier 141 is connected to a first input terminal of a balanced modulator 142. A second input terminal of the balanced modulator 142 is connected to the output terminal of a level conversion circuit 152 and is fed with the carrier signal.

The output terminal of the balanced modulator 142 is connected to the input terminal of an LPF2 (143). The output terminal of the LPF2 (143) is connected to a second input terminal Sb of the switch 113.

[Structure of the Demodulator and Downstream Components]

The output terminal of the RFADC 44 is connected to a first input terminal of the demodulator 125. The output terminal of the PLL circuit (indicated as PLL in FIG. 2) 153 is connected to a second input terminal for clock input of the demodulator 125 and also to the clock input terminal of the above-mentioned RFADC 44.

The output terminal of the demodulator 125 is connected to one input terminal of an AGC control circuit (automatic gain controller) 154, to the input terminal of a peak hold (PH) circuit 161, and to the input terminal of a bottom hold (BH) circuit 162. The output terminal of the AGC control circuit 154 is connected to the input terminal of the DAC 120, and the output terminal of the DAC 120 is connected to the control terminal of the VCA 115.

The output terminal of the above-mentioned PLL circuit 153 is connected to a first input terminal (CLK terminal) of a frequency divider 150. A second and a third input terminal (EN terminal and XRST terminal) of the frequency divider 150 are connected to the output terminal of a reference clock generation circuit 151.

The output terminal of the frequency divider 150 is connected to the input terminal of the level conversion circuit 152. The output terminal of the level conversion circuit 152 is connected to a second input terminal of the above-mentioned balanced modulator 142 and used to feed the carrier signal to the latter.

The output signal from the PH circuit 161 and that from the BH circuit 162 are acquired either by the MPU 170 or by the servo DSP 57 via the register file 47. The output signal from the BH circuit 162 is input to an OFTRK slicer circuit 180.

[Description of the Workings of the Blocks in the RFAC Section]

The RFAC section is typically constituted by a first AC coupling, a GCA, a second AC coupling, a VCA, an equalizer (or LPF), a third AC coupling, and an A/D converter, all interconnected.

The first AC coupling (HPF 111) determines a low frequency time constant of the playback section. The cut-off frequency (noted as fc hereunder) of the first AC coupling is generally set to about 1/1000 of the Nyquist frequency (half the channel frequency of the RF signal).

The gain-controlled amplifier (GCA) 112 sets an appropriately fixed gain in keeping with the reflectance of the optical disk 11 and the product of read power. This amplifier brings the average operation amplitude of the RFAC section to a predetermined value.

The second AC coupling (HPF 114) is intended to suppress the dynamic offset upon AGC pull-in by the downstream VCA 115. The cut-off frequency fc is generally set equal to or lower than the frequency of 1 decade (1/10) of the first AC coupling.

The voltage-controlled amplifier (VCA) 115 is variably controlled in gain by the downstream AGC control circuit 154, in such a manner as to keep constant the output amplitude of the RFADC 44.

The equalizer is a high-frequency boost circuit that equalizes the RF signal and ensures eye aperture thereby. There exist known arrangements whereby high-frequency boost is carried out in the digital domain following A/D conversion. In such cases, this stage is implemented not by an equalizer but by an AAF (anti-aliasing filter; LPF 116). The typical structure described hereunder is assumed to use the AAF.

The third AC coupling (HPF 118) is intended to suppress injection of the offset generated in the preceding stage into the downstream A/D converter. The cut-off frequency fc of the third AC coupling is generally set equal to or lower than the frequency fc of the first and the second AC couplings.

The RFADC 44 is intended to convert the RFAC and RFDC signals from analog to digital form. The sampling frequency fs of the RFADC 44 is generally set equal to or higher than the channel frequency (fcck) of the RF signal. The sampling clock may be in synchronism with the RF signal (synchronous PLL) or may be asynchronous therewith (fixed clock). The present invention is not dependent on sampling synchronism and thus can be applied to both of these cases. The example of fixed sampling will be used in the description that follows.

The RFAC section is inactive at seek time when the OFTRK signal is needed or upon execution of OPC (optimum power control) requiring detection of the modulation factor. In such cases, the RFAC section may be appropriated for the generation of the OFTRK signal or for modulation factor detection.

[Description of the Workings of the Blocks in the RFDC Section]

Described below is the RFDC section as part of this embodiment. The RFDC signal is identical with the above-mentioned RF_sum signal obtained by summing up the quadrant outputs A, B, C and D from the PDIC 35. This is a unipolar (+) signal that sums up an average reflectance, the DC component (called PI) proportional to the product of read power, and the RF signal. The average reflectance is an average of mark reflectance and space reflectance.

The RF_sum signal is acquired through the calculation of $\Sigma(A, B, C, D)$ performed by the PDIC 35 in the optical pickup unit 30. As such, the signal is often transmitted through a route separate from that of A, B, C and D in order to ensure a sufficient S/N ratio required by the main path of the RFAC. However, since RF_sum $\Sigma(A, B, C, D)$, the present invention holds whenever either of the two signals is provided.

The RFDC signal processing section is made up of the OPAMP 131, amplifier 132, LPF1 (133), amplifier 134, and balanced modulation device 140. The balanced modulation device 140 is composed of the amplifier 141, balanced modulator 142, and LPF2 (143).

The LPF1 (133) is a low-pass filter that subjects the RFDC signal to band limitation. Illustratively, the LPF1 is formed integrally with the above-mentioned OPAMP 131, amplifier 132, and amplifier 134 and is installed as an inverting-summing integrator based on the OPAMP 131. In generating the OFTRK signal or detecting a modulation factor, the LPF1 need not transmit the RF signal having the highest frequency and need only preserve frequency components that ensure the maximum amplitude. For this reason, the cut-off frequency fc is set approximately to 5 T (fcck/10) through 2 T (fcck/4), where fcck stands for the channel clock frequency output from the PLL circuit 153 and fs denotes the sampling frequency.

The output signal of the above-mentioned inverting-summing integrator (sum circuit 130) is modulated by the downstream balanced modulation device 140 into a DSB (double sideband) signal.

The carrier frequency fca of this embodiment is set to fs/4 (fca=fs/4). For example, since the RF maximum frequency of the Blu-ray disc is 2 T (fcck/4) and since fs≧fcck, the carrier frequency fca needs to be set to fs/4 in order to prevent folding frequency stemming from balanced modulation.

The balanced modulator 142 in the balanced modulation device 140 may be implemented simply as a ring modulator using illustratively an MOS (metal oxide semiconductor) SW.

Because the bandwidth of the DSB signal is twice the original RFDC signal, the DSB signal is band-limited by the downstream LPF2 (143).

The cut-off characteristic of the LPF2 should preferably be symmetrical at −6 dB on the carrier frequency fca. This is a requirement for accurately turning the DSB into a VSB (vestigial sideband) to ensure a flat modulation-demodulation transfer characteristic.

However, since it is not mandatory to ensure a flat pass band characteristic for such purposes as the generation of the OFTRK signal or the detection of modulation factor, the bandwidth need only be limited in a manner that will not strain circuit design. For this reason, the cut-off frequency fc of the LPF2 is set approximately to fca/2 through 2*fca (* is the multiplication sign).

If band limitation through the AAF (anti-aliasing filter) is expected in the downstream RFAC signal processing circuit 110, then the LPF2 (143) may be omitted.

The DSB signal band-limited by the LPF2 is input to the RFAC section via the switch 113 furnished at the input of the VCA 115 in the RFAC section. Thereafter, the DSB signal is input to an A/D converter by way of a VCA*AAF*third AC coupling*A/D converter constituting a main path of the RFAC section, before being sampled by the fs frequency.

The demodulator 125 then demodulates the DSB signal digitalized by the RFADC 44. Although the use of a synchronous demodulator is preferred, the DSB signal is easily demodulated by a full-wave rectifier. That is because this DSB signal is an AM signal (i.e., DSB signal having the carrier signal) derived from the original signal that was the unipolar RFDC signal having the DC component.

<3. Description of the Overall Operation of the RF Signal Processing Circuit>

What follows is a description of the overall operation of the RF signal processing circuit 100 at on-track (ONTRK) time and at off-track (OFTRK) time.

[Operation at On-track Time]

With the optical pickup unit 30 controlled in tracking, the RF signals A, B, C and D output from the photodiode are summed up by the adder. The summed-up signal RF_sum is fed to the HPF 111 whereby low-frequency signals and noises are attenuated. The resulting RFAC signal is output to the GCA 112. The RFAC signal input to the GCA 112 is set to an appropriate fixed gain in accordance with the reflectance of the optical disk 11 and the product of read power. Thereafter, the RFAC signal is input to the first input terminal Sa of the switch 113.

At on-track time, the first input terminal Sa of the switch 113 is connected to the output terminal Sc so that the RFAC signal is obtained from the output terminal Sc. The RFAC signal output from the switch 113 is supplied to the HPF 114. This suppresses generation of the dynamic offset at AGC pull-in time. The RFAC signal is then output to the VCA 115.

[Operation at Off-track Time and Upon Modulation Factor Measurement]

On the other hand, when the optical pickup unit 30 is not controlled in tracking at seek time or when the modulation factor of mark strings is measured at OPC execution time, the RF signals A, B, C and D are fed to the OPAMP 131. The signals are summed up before being output to the amplifier 132. The RFDC signal following the summing by the OPAMP 131 is averaged to a quarter by the amplifier 132 before being input to the LPF1 (133).

The RFDC signal input to the LPF1 is band-limited by the frequency characteristic having the cut-off frequency fc of, say, fcck/10 to fcck/4, before being output to the amplifier 134.

The RFDC signal is amplified K-fold by the amplifier 134 before being input to the amplifier 141 of the balanced modulation device 140. The RFDC signal is halved by the amplifier 141 before being forwarded to the first input terminal of the balanced modulator 142.

The sampling frequency fs (=fcck+α) output from the PLL circuit 153 is quartered by the frequency divider 150 and then level-converted by the level conversion circuit 152. The output from the level conversion circuit 152 is supplied as the carrier signal to the second input terminal of the above-mentioned balanced modulator 142.

In the case of the Blu-ray disk, the maximum frequency is 2 T (fcck/4), and fs≧fcck. Thus the carrier frequency fca needs to be set to the frequency of fs/4≧2 T (fcck/4) in order to prevent adverse effects of the folding frequency of the balanced modulator 142.

The output DSB signal following the balanced modulation is input to the LPF2 (143) having the same cut-off frequency as that of the carrier frequency fca. The LPF2 outputs the DSB signal in VSB form. This DSB signal is input to the second input terminal Sb of the switch 113 and forwarded to the HPF 114 through the output terminal Sc. The DSB signal is then fed to the VCA 115 in the manner discussed above.

As described above, the signal whose path is changed by the switch 113 between on-track time and off-track time (including the time of modulation factor measurement) is fed to the HPF 118 via the VCA 115, LPF 116, and driver 117. The HPF 118 suppresses injection of the offset generated in the preceding stage and allows only signals having the cut-off frequency fc or higher to pass.

The signal output from the HPF 118 is input to the RFADC 44 whereby the input signal is converted from analog to digital form. At on-track time, the digitized RFAC signal is output to the digital signal processing circuit 45. At off-track time or upon modulation factor measurement, the digitized DSB signal is output to the modulator 125, to be discussed later. The demodulator 125 demodulates the input DSB signal through full-wave rectification and removes image components and carrier component leak from the demodulated signal to acquire an RFDC_demod signal.

At on-track time or upon modulation factor measurement, the RFAC signal or the DSB signal output from the RFADC 44 is input to the AGC control circuit (AGC controller) 154. The input signal is compared by the AGC control circuit 154 with a target level, and the resulting difference is integrated into a VCA control signal. This VCA control signal is supplied to the DAC 120 for conversion into an analog signal (e.g., analog voltage). Following the conversion, the analog signal is fed to the control terminal of the VCA 115 which in turn exercises control so that the output amplitude of the RFADC 44 reaches a predetermined value.

Meanwhile, the RFDC_demod signal output from the demodulator 125 is supplied to the PH circuit 161 and BH circuit 162. The peak hold value detected by the PH circuit 161 and the bottom hold value detected by the BH circuit 162 are acquired either by the MPU 170 or by the servo DSP 57 via the register file 47. The MPU 170 or the servo DSP 57 operates on the acquired values to obtain the modulation factor. The OFTRK slicer 180 binary slices the bottom hold value to acquire the OFTRK signal.

Explained below is an example showing how the OFTRK signal and modulation factor are obtained.

The PH and BH data acquired by the MPU 170 or servo DSP 57 are subjected to the following calculation:

Modulation factor=[1−(acquired BH value/acquired PH value)]   (1)

The modulation factor thus calculated is used as an OPC index.

Illustratively, if the target amplitude of the RFAGC is set to $2^N$ (e.g., N=5), then the above-mentioned effect of the RFAGC gives the following value:

$$\text{Acquired PH value being always } [4*2^{(N-1)}] \quad (2)$$

where, N is a positive integer larger than 1.

In this case, the modulation factor may be computed accurately in real time by making the following calculation:

$$\text{Modulation factor}=[1-(\text{value obtained by shifting the acquired BH value}((N-1)+2)\text{bits right}] \quad (3)$$

In the above description, the notation "4*" indicates a two-bit increment through FIR (filter) 1*FIR (filter) 2.

The OFTRK signal is generated by binary slicing the output of the BH circuit 162. The OFTRK signal is obtained by the servo DSP 57. The servo DSP 57 uses the OFTRK signal to apply pulling brakes at seek time.

FIGS. 3A through 3E show signal waveforms appearing at major terminals shown in FIG. 2.

Figure 3A:
FIGS. 3A, 3B, 3C, 3D and 3E are waveform charts showing typical waveforms output from various blocks shown in FIG. 2.

What is shown in FIG. 3A is a signal waveform of the RF_sum signal representing an RF signal which is output from the optical pickup unit 30 and which sums up the signals A, B, C and D of the PDIC 35 (the signal location is indicated by leader line "a" in FIG. 2).

Figure 3B:
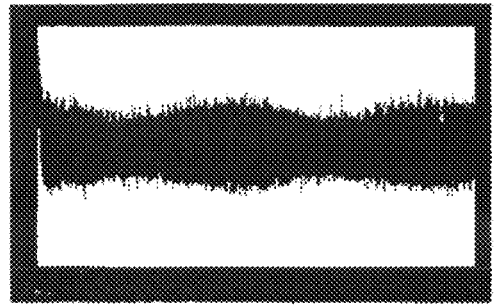

FIG. 3B shows a signal waveform of the RFAC signal appearing at the output terminal of the GCA 112. This signal waveform represents the RFAC signal which is a bipolar (+/−) signal obtained by removing the DC component using the HPF 111 (AC coupling) to extract only the AC component (the signal location is indicated by leader line "b" in FIG. 2).

Figure 3C:
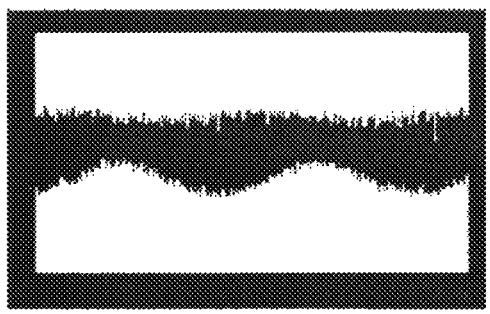

FIG. 3C shows a signal waveform of the RFDC_sum signal output from the amplifier 134. This signal is formed by first summing up the signals A, B, C and D coming from the photodiode of the optical pickup unit 30, the summed-up signal being thereafter fed through the amplifier 132 and LPF1 (133) to reach the amplifier 134 (the signal location is indicated by leader line "c" in FIG. 2). As discussed above, in order to generate the OFTRK signal and to detect the modulation factor, there is no need to transmit the RF signal having the highest frequency; the frequency components that ensure the maximum amplitude need only be preserved. Therefore, the cut-off frequency fc of the LPF1 (133) is set approximately to 5 T (fcck/10) through 2 T (fcck/4) in the case of the Blu-ray disk. Thus what is shown in FIG. 3C is the waveform minus part of the high-frequency component.

Figure 3D:

FIG. 3D shows a signal waveform of the DSB signal output from the balanced modulation device 140. This signal is generated by the LPF2 (143) band-limiting the signal modulated by the balanced modulator 142 (the signal location is indicated by leader line "d" in FIG. 2).

Figure 3E:
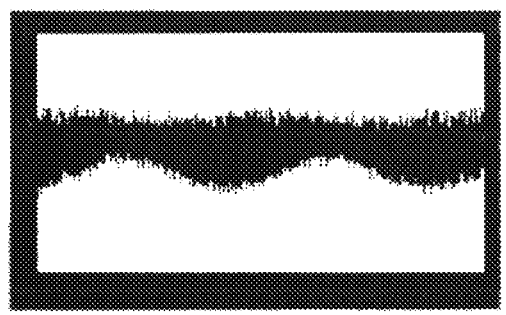

FIG. 3E shows a signal waveform of the RFDC_demod signal obtained by the demodulator 125 full-wave-rectifying the DSB signal, followed by image removal and elimination of carrier signal leak. The waveform chart is provided by the DAC, not shown, converting the RFDC_demod signal into an analog signal for display purposes (the signal location is indicated by leader line "e" in FIG. 2).

<4. Description of the Structure and Operation of the Demodulator>

Figure 4:
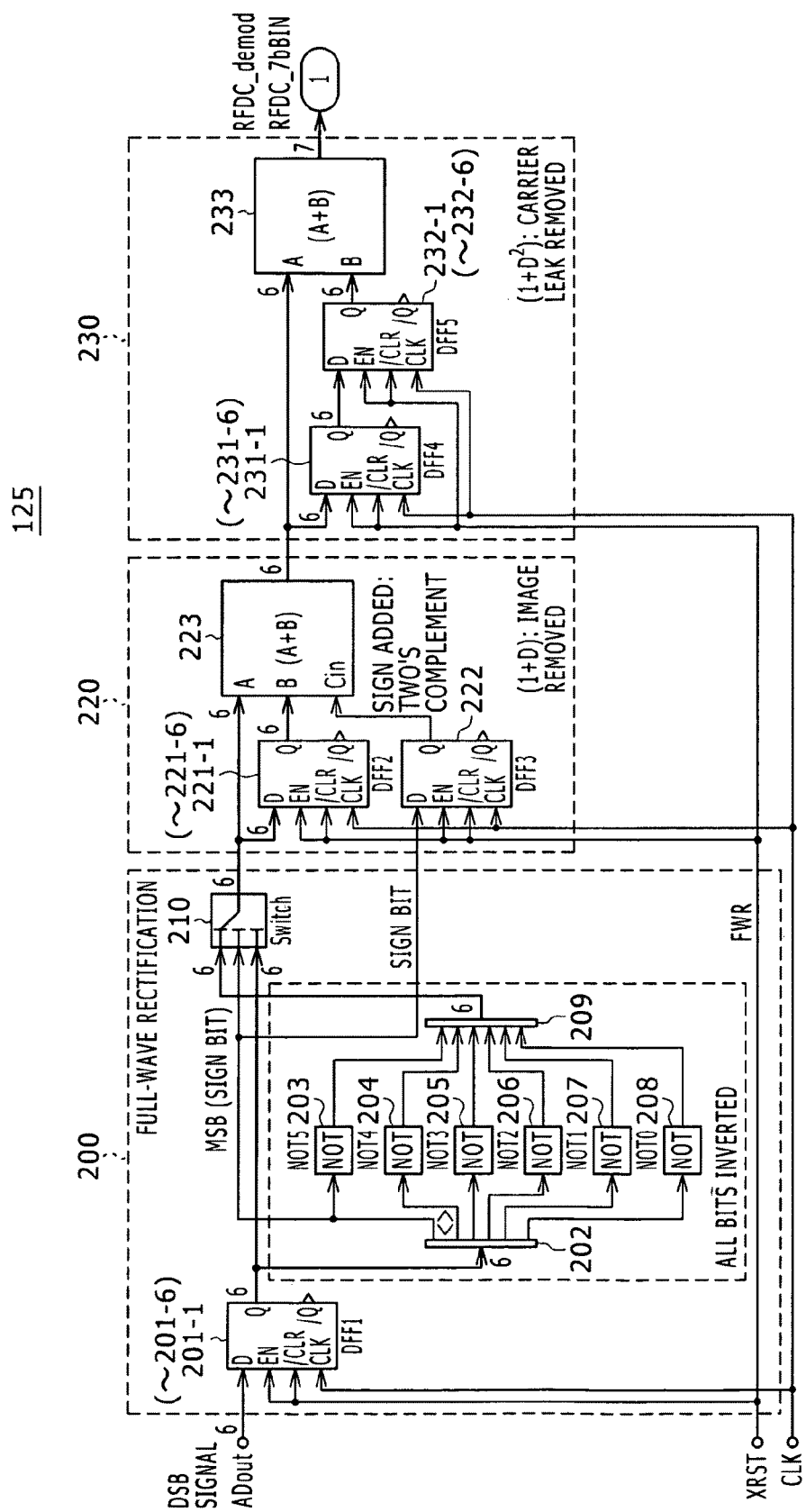
FIG. 4 is a block diagram of a demodulator.

FIG. 4 shows a typical structure of the demodulator 125 constituting part of the preferred embodiment. The demodulator 125 of FIG. 4 corresponds to the demodulator 125 shown in FIG. 2.

[Structure of the Demodulator]

The demodulator 125 is made up of a full-wave rectifier 200, an image removal block (FIR filter 1) 220, and a carrier leak removal block (FIR filter 2) 230.

[Structure of the Full-wave Rectifier (FWR)]

What follows is a description of the block structure of the full-wave rectifier (FWR) 200 that full-wave-rectifies a six-bit digital signal output from the RFADC 44.

The output terminal of the RFADC 44 is connected to a terminal D of a DFF (D type flip-flop) 1. The output through which a clock XRST is output from the reference clock generation circuit 151 is connected to the terminal EN (enable) and a terminal /CLR (clear) of the DFF1. The output terminal of the PLL circuit 153 is connected to a terminal CLK (clock) of the DFF1. The number of DFF1's to be configured is determined by the number of the output bits of the RFADC 44. For example, in the case of six bits that are output, six DFF1's are provided so that their respective input terminals (D) are connected to the bit output terminals of the RFADC 44. In this example, one DFF1 (201-1 through 201-6) is described for simplification and illustration.

The output terminal Q of the DFF1 is connected to a third input terminal of a switch 210 and a gate 202. The output terminal of the gate 202 is connected to the input terminals of NOT circuits 203 through 208. The output terminal through which MSB (sign bit) data is output from the gate 202 is connected to the input terminal of the NOT circuit 203 and to a second input terminal of the switch 210.

The output terminals of the NOT circuits 203 through 208 are connected to the input terminal of a gate 209. The output terminal of the gate 209 is connected to a first input terminal of the switch 210.

[Structure of the Image Removal Block]

The output terminal of the switch 210 is connected to an input terminal A of an adder 223 and to an input terminal D of a DFF2 (221-1 through 221-6).

Terminals EN and /CLR of the DFF2 are connected to the output terminal of the reference clock generation circuit 151. A terminal CLK of the DFF2 is connected to the output terminal of the PLL circuit 153. The output terminal Q of the DFF2 is connected to an input terminal B of the adder 223. There are provided six DFF2's commensurate with the six-bit data to be output from the switch 210 so that bit operations are carried out in parallel.

An input terminal D of a DFF3 (222) is connected to the output terminal through which the MSB (sign bit) is output from the gate 202, and to the input terminal of the NOT circuit 203.

Terminals EN and /CLR of the DFF3 are connected to the output terminal of the reference clock generation circuit 151, and a terminal CLK of the DFF3 is connected to the output terminal of the PLL circuit 153. An output terminal Q of the DFF3 is connected to an input terminal Cin of the adder 223.

[Structure of the Carrier (Signal) Leak Removal Block]

The output terminal of the adder 223 is connected to an input terminal A of an adder 233 and to an input terminal D of a DFF4 (231-1 through 231-6). The adder 223 has a number of output terminals corresponding to the number of output bits. Illustratively, the adder 223 has six output terminals corresponding to six output bits, so six DFF4's are configured. The input terminal D of each DFF4 is connected to the output terminal of each bit of the adder 223.

Terminals EN and /CLR of the DFF4 are connected to the output terminal of the reference clock generation circuit 151. A terminal CLK of the DFF4 is connected to the output terminal of the PLL circuit 153.

An output terminal Q of the DFF4 (231-1 through 231-6) is connected to an input terminal D of a DFF5 (232-1 through 232-6). Terminals EN and /CLR of the DFF5 are connected to the output terminal of the reference clock generation circuit 151. A terminal CLK of the DFF5 is connected to the output terminal of the PLL circuit 153.

The output terminal Q of the DFF5 is connected to an input terminal B of the adder 233. The output terminal of the adder 233 is connected to the input terminals of the AGC controller (AGC circuit) 154, PH circuit 161, and BH circuit 162 shown in FIG. 2. Six DFF5's are provided corresponding to the six DFF4's (231) configured.

[Description of the Operation of the Demodulator]

Described below is the operation of the demodulator 125 shown in FIG. 4.

The DSB signal is a six-bit two's complement digital signal output from the RFADC 44. This DSB signal is fed to the DFF1 and delayed by one clock pulse (one sample) to synchronize with the clock CLK, before being output to the switch 210 and gate 202.

When the two's complement digital data (signal) output from the RFADC 44 is a positive value, the MSB (sign bit) causes the third input terminal of the switch 210 to connect with its output terminal. The digital signal output from the terminal Q of the DFF1 is output to the third input terminal of the switch 210.

On the other hand, when the two's complement data output from the RFADC 44 is a negative value, the MSB (sign bit) causes the first input terminal of the switch 210 to connect with its output terminal and thus changes the signal path.

In this case, the bits of the data input to the gate 202 are input to the NOT circuits 203 through 208. The data is thus inverted before being output to the downstream gate 209. The inverted data output from the output terminal of the gate 209 is forwarded to the switch 210.

Thus if the data output from the RFADC 44 is positive, the data is input unchanged to the switch 210. If the data is negative, then the data has all its bits inverted by the NOT circuits 203 through 208 before being output to the switch 210 via the gate 209.

In the FWR (full-wave rectifier) 200, the negative data out of the bipolar DSB signal data is inverted in the manner described above for full-wave rectification.

The full-wave-rectified unipolar (positive) six-bit two's complement digital signal is supplied to the input terminal A of the adder 223. Meanwhile, the six-bit data delayed by one sample (one clock pulse) by the DFF2 (221-1 through 221-6) is fed to the input terminal B of the adder 223. The two data are summed up and turned into digital data (A+B). The sign bit input to the DFF3 (222) is output to the input terminal Cin of the adder 223 in synchronism with the DFF2 and is added in the adder 223 to the inverted digital data for two's complementation.

That is, the adder 223 sums up the six-bit data (signal) output from the switch 210 and the six-bit data delayed by one sample. The add operation enables the image removal block 220 to constitute an FIR filter which has the characteristic of [1+D] (where D denotes a one-sample delay) and which manifests the transfer characteristic of having null points in the fs/2 frequency. This suppresses the residual image signal (component) in the DSB signal.

The six-bit binary digital signal output from the adder 223 is fed to the input terminal A of the adder 233 and to the input terminal D of the DFF4 (231-1 through 231-6). The digital signal input to the DFF4 is delayed by one clock pulse (one sample) before being output to the input terminal D of the downstream DFF5 (232-1 through 232-6). The data input to the DFF5 is further delayed by one clock pulse (one sample) and output to the input terminal B of the adder 233. The two digital signals input to the terminals A and B of the adder 233 are summed up and turned into digital data (A+B).

The six-bit binary data output from the adder 223 is added to the six-bit binary data delayed by two samples by the DFF4 and DFF5. The sum is a seven-bit binary digital signal that is output as the RFDC_demod signal.

That is, the carrier leak removal block 230 with its DFF4, DFF5 and adder 233 constitutes an FIR filter which has the characteristic of $[1+D^2]$ (where D denotes a delay of one clock pulse) and which manifests the transfer characteristic of having null points in the fs/4 frequency. This filter thus suppresses the residual carrier component attributable to offset.

FIGS. 5A through 5D illustrate a frequency characteristic of the RFDC_sum signal, a frequency characteristic of the signal following modulation, and a frequency characteristic subsequent to demodulation.

Figure 5A:
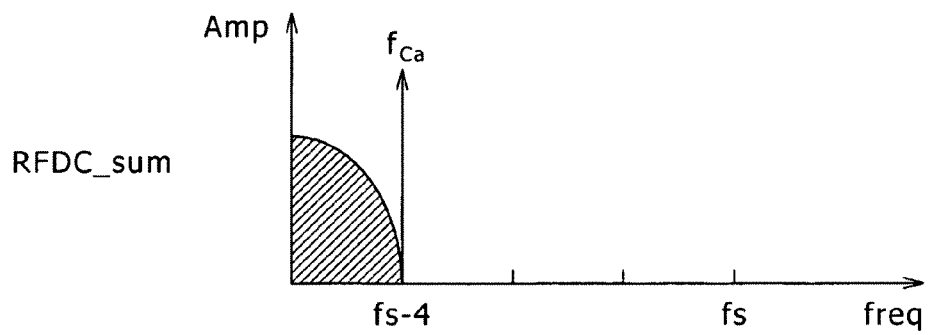
FIGS. 5A, 5B, 5C and 5D are graphic representations showing typical frequency characteristics of the RFAC signal processing circuit, RFDC signal processing circuit, and demodulator.

FIG. 5A shows a typical frequency characteristic of the RFDC_sum signal. The horizontal axis of the graph denotes frequencies and the vertical axis represents amplitude values. This graph illustrates the characteristic of the RFDC_sum signal in effect when the carrier frequency fca (=fs/4) is set to 16.5 MHz while the sampling frequency fs (=fcck+α) output from the PLL circuit 153 is 66 MHz.

Figure 5B:
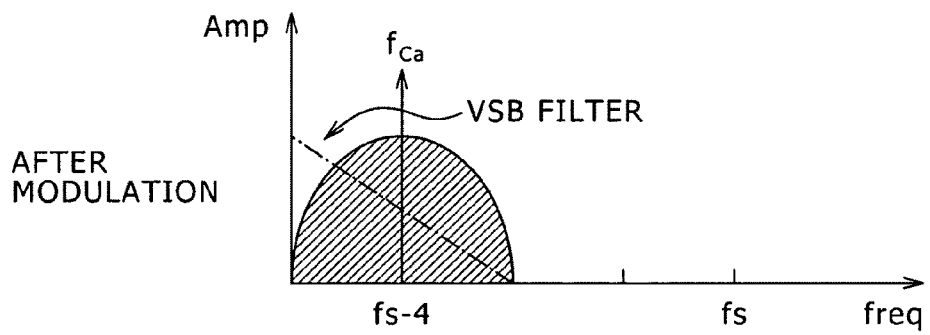

FIG. 5B shows a typical frequency characteristic of the modulated signal output from the balanced modulator 142. Since the carrier frequency fca is 16.5 MHz, the RFDC_sum signal is shown to be symmetrical around the carrier frequency fca. In FIG. 5B, the filter characteristic of the LPF2 (143) is indicated by a broken line; the signal is turned into VSB (vestigial sideband) form to ensure a flat modulation-demodulation transfer characteristic.

Figure 5C:
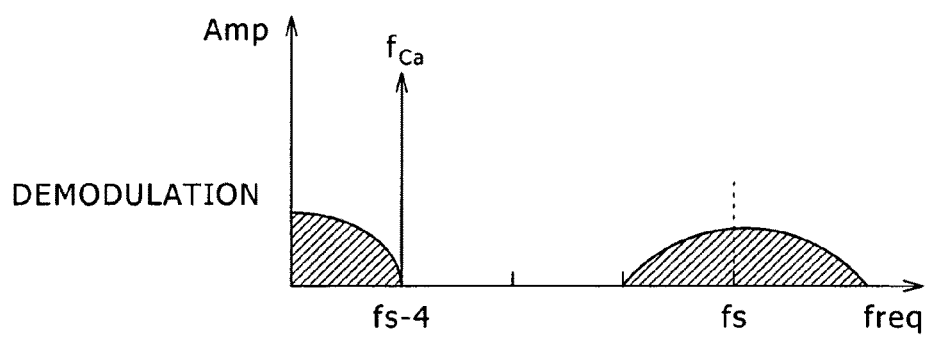

FIG. 5C shows a typical frequency characteristic of the signal following demodulation. As illustrated in FIG. 5C, a spurious radiation is generated around the sampling frequency fs.

Figure 5D:
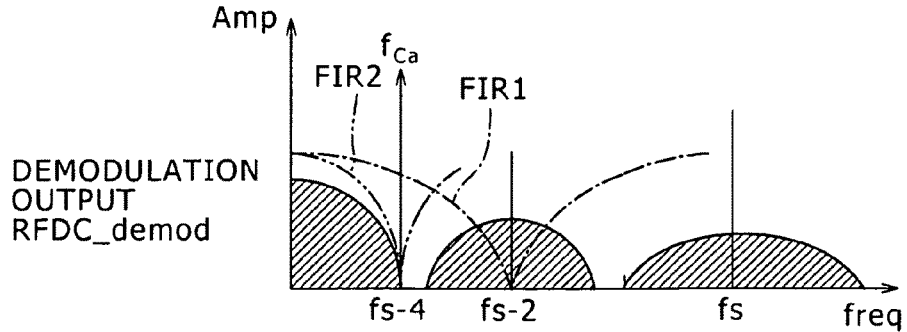

FIG. 5D graphically illustrates a carrier signal leak (fca=fs/4), an image signal (fs/2), and a spurious radiation (waveform near fs) from the demodulator 125. These frequency characteristics are shown side by side with those of the image removal block (FIR (filter) 1) 220 and the carrier leak removal block (FIR (filter) 2) 230.

The present invention does not require rectifying the spectrum of the DSB signal into complete VSB form. This entails an imbalance in the synthesis of positive and negative bands by the demodulator, leaving in the demodulated signal a residual image component formed around the carrier frequency fca being multiplied twofold (2*fca=fs/2).

However, as shown in FIG. 5D, this image component can be suppressed by the FIR filter 1 composed of an FIR filter arrangement having the transfer characteristic of [1+D] (where D denotes a delay of one sample (clock pulse)) with null points in fs/2.

Generally, an input conversion offset exists in the RFADC 44. This was shown to be the cause of an inexactitude in modulation factor detection in the ordinary examples (2) and (3) discussed earlier.

According to the present invention, the digital signal is led to pass through the synchronous demodulator or full-wave rectifier 200 whereby the offset of the RFADC 44 is converted to the carrier component of fca=fs/4. The use of the filter arrangement thus removes the adverse effects of the DC offset.

The FIR filter 2 for removing the carrier component (signal) leak is constituted by an FIR filter which has the transfer function of [1+D²] having null points in fs/4. This filter removes the residual carrier component attributable to the offset.

Furthermore, when the transfer function of the FIR filter 1 or FIR filter 2 is set to include a suitable tap coefficient having a boost characteristic, it is possible to make the characteristic within the transmission bandwidth flat.

If the time constant of the downstream digital PH circuit or digital BH circuit is sufficiently large, then the above-described FIR filter 1 and FIR filter 2 may be omitted.

As described above, the present invention involves adding a simple modulator to the input device of the RFDC section, thereby suppressing increases in the scale of circuitry or the amount of power consumption and implementing the RFDC signal input section.

The present invention also involves additionally installing a minimum of hardware resources that permit OPC (optimum power control) using modulation factor and achieve high-speed seek operations while making use of pulling brakes based on the OFTRK signal.

At the time of modulation factor acquisition such as upon OPC, the amplitude of the DSB signal derived from balanced modulation of the RFDC signal corresponds to the TOP of the RFDC signal and is proportional to the reflectance in effect. Thus it is possible to normalize the demodulated RFDC signal with reflectance in real time by making the amplitude of the DSB signal steady in real time through the use of the RFAGC. This suppresses those variations out of modulation factor calculations which result from the in-plane variations of reflectance, thereby raising the accuracy and convergence rate of OPC.

Illustratively, the PLL circuit 153 and reference clock generation circuit 151 correspond to the signal generation circuit of the present invention configured to generate the carrier signal. The operational amplifier (OPAMP) 131 corresponds to the first signal processing device of the invention configured to output the unipolar RFDC signal by adding up a plurality of signals output from the photodetector of the optical pickup unit. The HPF 111 and GCA 112 correspond to the second signal processing device of the invention configured to output the bipolar RFAC signal by adding up a plurality of signals output from the photodetector of the optical pickup unit and then removing the DC component. The balanced modulation device 140 corresponds to the modulator of the invention configured to be fed with the unipolar RFDC signal and the carrier signal so as to modulate the carrier signal with the RFDC signal to output the modulated signal. The switch 113 corresponds to the switch of the invention configured to be fed with either the bipolar RFAC signal or the modulated signal coming from the modulator, the switch being further configured to output either the bipolar RFAC signal if the bipolar RFAC signal is input or the modulated signal coming from the modulator following a switchover of signal paths if the RFDC signal is input. The demodulator 125, PH (peak hold) circuit 161, BH (bottom hold) circuit 162, MPU 170, and OFTRK slicer 180 correspond to the third signal processing device of the invention configured to demodulate the modulated signal in order to derive either a modulation factor or an off-tracking signal from the demodulated signal.

The present application contains subject matter related to that disclosed in Japanese Priority Patent Application JP 2009-034042 filed in the Japan Patent Office on Feb. 17, 2009, the entire content of which is hereby incorporated by reference.

It should be understood by those skilled in the art that various modifications, combinations, sub-combinations and alternations may occur depending on design requirements and other factors insofar as they are within the scope of the appended claims or the equivalent thereof.

What is claimed is:

1. An optical disk playback apparatus comprising:
    a signal playback device configured to read and decode information recorded to an optical disk through an optical pickup unit in order to reproduce said information;
    said signal playback device including
        a signal generation circuit configured to generate a carrier signal,
        a first signal processing device configured to sum up a plurality of signals output from a photodetector of said optical pickup unit in order to output a unipolar RFDC signal,
        a second signal processing device configured to sum up the plurality of signals output from said photodetector of said optical pickup unit and then remove a DC component from the summed-up signal in order to output a bipolar RFAC signal,
        a modulator configured to be fed with said unipolar RFDC signal and said carrier signal so as to modulate said carrier signal with said RFDC signal to output a modulated signal,
        a switch configured to be fed with either said bipolar RFAC signal or said modulated signal coming from said modulator, said switch being further configured to output either said bipolar RFAC signal if said bipolar RFAC signal is input or said modulated signal coming from said modulator following a switchover of signal paths if said RFDC signal is input,
        an analog to digital converter configured to digitize either said modulated signal or said RFAC signal output from said switch, and
        a third signal processing device configured to demodulate said modulated signal digitized by said analog to digital converter in order to derive at least either a modulation factor or an off-tracking signal from the demodulated signal.

2. The optical disk playback apparatus according to claim 1, wherein said modulator includes a ring modulator or a like component made of metal oxide semiconductor transistors or like elements and configured to balanced-modulate said carrier signal with said unipolar RFDC signal.

3. The optical disk playback apparatus according to claim 2, wherein said modulator includes a vestigial sideband filter configured to turn modulated waves that are balanced-modulated relative to the output of said ring modulator, into a vestigial sideband.

4. The optical disk playback apparatus according to claim 3, wherein the breaking characteristic of said vestigial sideband filter is −6 dB in terms of the frequency of said carrier signal.

5. The optical disk playback apparatus according to claim 3, wherein the cut-off frequency of said vestigial sideband filter is substantially from half to twice the frequency of said carrier signal.

6. The optical disk playback apparatus according to claim 1, further comprising:
    a low-pass filter loaded upstream of said modulator and configured in such a manner that the cut-off frequency of said low-pass filter is held lower than a maximum frequency of said RFAC signal.

7. The optical disk playback apparatus according to claim 1, wherein said third signal processing device includes a digital computing element configured to acquire either an off-track signal or a modulation factor from a peak hold value and a bottom hold value.

8. The optical disk playback apparatus according to claim 1, wherein said third signal processing device includes a demodulator configured to full-wave rectify the input signal.

9. The optical disk playback apparatus according to claim 8, wherein said demodulator includes a filter configured to remove a carrier signal leak or an image signal from the full-wave rectified signal.

10. The optical disk playback apparatus according to claim 1, further comprising:
a voltage controlled amplifier circuit located upstream of said analog to digital converter and configured to control the input amplitude of said analog to digital converter;
an automatic gain control circuit located downstream of said analog to digital converter and configured to control the output amplitude of said analog to digital converter to a predetermined value; and
a digital to analog conversion circuit configured to convert a control signal of said automatic gain control circuit into analog form to control the gain of said voltage controlled amplifier circuit.

11. An optical disk recording/playback apparatus comprising:
a signal recording device configured to write coded information to an optical disk through an optical pickup unit; and
a signal playback device configured to read and decode the information recorded to said optical disk in order to reproduce said information,
said signal playback device including
a signal generation circuit configured to generate a carrier signal,
a first signal processing device configured to sum up a plurality of signals output from a photodetector of said optical pickup unit in order to output a unipolar RFDC signal,
a second signal processing device configured to sum up the plurality of signals output from said photodetector of said optical pickup unit and then remove a DC component from the summed-up signal in order to output a bipolar RFAC signal,
a modulator configured to be fed with said unipolar RFDC signal and said carrier signal so as to modulate said carrier signal with said RFDC signal to output a modulated signal,
a switch configured to be fed with either said bipolar RFAC signal or said modulated signal coming from said modulator, said switch being further configured to output either said bipolar RFAC signal if said bipolar RFAC signal is input or said modulated signal coming from said modulator following a switchover of signal paths if said RFDC signal is input,
an analog to digital converter configured to digitize either said modulated signal or said RFAC signal output from said switch, and
a third signal processing device configured to demodulate said modulated signal digitized by said analog to digital converter in order to derive at least either a modulation factor or an off-tracking signal from the demodulated signal.

12. The optical disk recording/playback apparatus according to claim 11, wherein said modulator includes a ring modulator or a like component made of metal oxide semiconductor transistors or like elements and configured to balanced-modulate said carrier signal with said unipolar RFDC signal.

13. The optical disk recording/playback apparatus according to claim 12, wherein said modulator includes a vestigial sideband filter configured to turn modulated waves that are balanced-modulated relative to the output of said ring modulator, into a vestigial sideband.

14. The optical disk recording/playback apparatus according to claim 13, wherein the breaking characteristic of said vestigial sideband filter is −6 dB in terms of the frequency of said carrier signal.

15. The optical disk recording/playback apparatus according to claim 13, wherein the cut-off frequency of said vestigial sideband filter is substantially from half to twice the frequency of said carrier signal.

16. The optical disk recording/playback apparatus according to claim 11, further comprising
a low-pass filter loaded upstream of said modulator and configured in such a manner that the cut-off frequency of said low-pass filter is held lower than a maximum frequency of said RFAC signal.

17. The optical disk recording/playback apparatus according to claim 11, wherein said third signal processing device includes a digital computing element configured to acquire either an off-track signal or a modulation factor from a peak hold value and a bottom hold value.

18. The optical disk recording/playback apparatus according to claim 11, wherein said third signal processing device includes a demodulator configured to full-wave rectify the input signal.

19. The optical disk recording/playback apparatus according to claim 18, wherein said demodulator includes a filter configured to remove a carrier signal leak or an image signal from the full-wave rectified signal.

20. The optical disk recording/playback apparatus according to claim 11, further comprising:
a voltage controlled amplifier circuit located upstream of said analog to digital converter and configured to control the input amplitude of said analog to digital converter;
an automatic gain control circuit located downstream of said analog to digital converter and configured to control the output amplitude of said analog to digital converter to a predetermined value; and
a digital to analog conversion circuit known as DAC and configured to convert a control signal of said automatic gain control circuit into analog form to control the gain of said voltage controlled amplifier circuit.

* * * * *